United States Patent [19]
Durairaj et al.

[11] Patent Number: 5,945,500
[45] Date of Patent: Aug. 31, 1999

[54] NON-VOLATILE RESORCINOLIC RESINS AND METHODS OF MAKING AND USING THE SAME

[75] Inventors: Raj B. Durairaj, Monroeville; Alex Peterson, Jr., Pittsburgh, both of Pa.

[73] Assignee: Indspec Chemical Corp., Pittsburgh, Pa.

[21] Appl. No.: 09/130,221

[22] Filed: Aug. 6, 1998

Related U.S. Application Data

[62] Division of application No. 08/812,517, Mar. 7, 1997.

[51] Int. Cl.$^6$ .................................................. C08G 59/00
[52] U.S. Cl. .............................. 528/96; 528/97; 528/104; 528/105; 528/106; 528/205; 525/68; 525/132
[58] Field of Search ................................ 528/96, 97, 104, 528/105, 106, 205; 525/68, 132

[56] References Cited

U.S. PATENT DOCUMENTS

| | | | |
|---|---|---|---|
| 3,751,331 | 8/1973 | Dane et al. | 161/83 |
| 4,092,455 | 5/1978 | Pinto et al. | 428/295 |
| 4,476,262 | 10/1984 | Chu et al. | 523/412 |
| 4,605,696 | 8/1986 | Benko et al. | 524/432 |
| 4,731,430 | 3/1988 | Kempter et al. | 528/139 |
| 4,889,891 | 12/1989 | Durairaj et al. | . |
| 4,892,290 | 1/1990 | Durairaj et al. | 525/160 |
| 4,990,364 | 2/1991 | Bolte et al. | 427/44 |
| 5,021,522 | 6/1991 | Durairaj et al. | 525/502 |
| 5,030,692 | 7/1991 | Durairaj et al. | 525/134 |
| 5,049,641 | 9/1991 | Hood et al. | 528/155 |
| 5,244,725 | 9/1993 | Dressler et al. | 428/289 |

*Primary Examiner*—Randy Gulakowski
*Attorney, Agent, or Firm*—Diane R. Meyers; Arnold B. Silverman; Eckert Seamans Cherin & Mellott, LLC

[57] ABSTRACT

Methods for preparing low free resorcinol resins are disclosed. These methods generally comprise reacting a resin with an aromatic olefinic compound; suitable resins include one or more resins selected from the group consisting of a dihydric phenol, a polyhydric phenol, a dihydric phenolic novolak resin and a polyhydric phenolic novolak resin; the addition product of at least one of these resins and at least one compound selected from the group consisting of a monooxirane compound and a polyoxirane compound; and a phenol or alkyl or aralkyl substituted mono- or dihydric phenol modified form of these resins. The resins produced by this method are also disclosed, as are rubber compositions utilizing the resin produced by this method.

15 Claims, No Drawings

NON-VOLATILE RESORCINOLIC RESINS AND METHODS OF MAKING AND USING THE SAME

This Application is a Divisional case of U.S. Ser. No. 08/812,517 filed on Mar. 7,1997 now allowed.

BACKGROUND OF THE INVENTION

1. Field of the Invention

This invention relates to improved resorcinolic resins having a low free resorcinol content, and methods of making and using the same. These resins are particularly useful as bonding and stiffening agents in the production of rubber compositions, imparting improved physical and mechanical properties such as low volatility, reduced fuming in rubber compounding, and improved adhesion properties of vulcanized rubber and rubber composites.

2. Background Information

The performance of rubber composites in articles such as tires, belts and hose products depends on numerous factors including the quality of adhesion between the rubber and reinforcing materials, and the mechanical properties of the cured rubber matrix in contact with the reinforcing materials.

The conventional method of optimizing the adhesion of the rubber to the reinforcement entails compounding into the rubber before vulcanization a two-part adhesive system that includes a methylene donor and a methylene acceptor. The methylene donor generates methylene or methylol groups capable of reacting or crosslinking with the methylene acceptor, which interacts with the rubber and reinforcing material with a resultant increase in adhesion of the rubber to the reinforcing material. Because the methylene donor and the methylene acceptor are compounded into the rubber, they can have a significant effect on the properties of the final rubber product.

Dihydric phenols, polyhydric phenols and phenolic novolak resins have long been used in the rubber industry as methylene acceptors. For example, resorcinol is a widely used dihydric phenol methylene acceptor for bonding rubber to the reinforcing materials. Resorcinolic methylene acceptors can present processing problems, however, by generating volatiles such as free resorcinol at Banbury temperatures.

The most commonly used methylene donors include, for example, hexamethylenetetramine and various methylol or methoxymethyl melamines. Other methylene donors are described in U.S. Pat. No. 3,751,331.

The in situ resin formed by the reaction of the resorcinolic methylene acceptor and the methylene donor promotes adhesion between the rubber and reinforcing materials which include, for example, steel, glass and organic filaments, fibers, cords and fabrics. In addition, the resorcinolic resin also provides rubber vulcanizates with improved hardness and dynamic stiffness properties. These compounding additives also act as thermosetting plasticizers, providing easier processibility, and excellent extrusions for the rubber compounds. The disadvantage, however, of these resorcinolic compounding additives is that they can generate an undesirable amount of fuming in Banbury mixing and calendaring operations.

U.S. Pat. No. 4,889,891 discloses alkyl substituted resorcinolic novolak resins as suitable methylene acceptors for vulcanizable rubber compositions.

U.S. Pat. No. 4,892,908 discloses the use of keto derivatives of resorcinol, such as benzoyl resorcinol, as methylene acceptors in vulcanizable rubber compositions.

U.S. Pat. No. 4,605,696 discloses use of monoesters of resorcinol, including resorcinol monobenzoate and resorcinol monorosinate, in rubber compositions.

U.S. Pat. No. 5,021,522 discloses aralkyl substituted resorcinolic novolak resins including a styrene substituted resorcinol formaldehyde resin.

U.S. Pat. No. 5,030,692 discloses alkylphenol modified resorcinolic novolak resins.

U.S. Pat. No. 4,731,430 discloses phenol resins modified with compounds possessing amide and/or imide groups that are useful as crosslinking agents and in the preparation of adhesives and rubber assistants.

U.S. Pat. No. 4,990,364 describes a process for producing porous phenolic resin fibers including the step of thermally decomposing a graft polymer containing a vinyl group.

U.S. Pat. No. 5,244,725 discloses a vulcanizable rubber composition that includes a rubber component, a methylene donor and a methylene acceptor.

U.S. Pat. No. 4,476,262 discloses a water dilutable resinous product prepared by reacting together a resin, an aldehyde and a sulfurous or organic acid.

There remains, however, a very real and substantial need for further improved bonding additive resins that may be used as methylene acceptors and that, in combination with suitable methylene donors, have enhanced curing properties, mechanical properties, and improved bonding and stiffening properties in vulcanizable rubber compositions. In addition, there remains a very real and substantial need for non-volatile resorcinol resins.

SUMMARY OF THE INVENTION

The present invention has met the above-described needs. The present invention provides a method for reducing the free monomer content in a resin comprising reacting the resin with an aromatic olefinic compound. Suitable resins include, for example, one or more resins selected from the group consisting of a dihydric phenol, a polyhydric phenol, a dihydric phenolic resin and a polyhydric phenolic resin; the addition product of at least one of these resins and at least one compound selected from the group consisting of a monooxirane compound and a polyoxirane compound; and the phenol or alkyl or aralkyl substituted mono- or dihydric phenol modified forms of these resins. The present invention also provides the low free resorcinol resins produced by this method.

Another embodiment of this invention provides a rubber composition comprising: (a) a rubber component; (b) a methylene donor; and (c) a methylene acceptor; the methylene acceptor is prepared by reacting an aromatic olefinic compound with a resin such as those described above. Reinforced rubber articles further comprising (d) a reinforcing material are also provided by the present invention.

It is an object of the present invention to provide a method for reducing the free monomer content in a resin.

It is an object of the present invention to provide a method for producing a resorcinolic resin with a low free resorcinol content.

It is another object of the present invention to provide a resin having a low free monomer content.

It is a further object of the present invention to provide a resorcinolic resin with a low free resorcinol content.

It is another object of the present invention to provide a resorcinolic resin having a low free resorcinol content for use in rubber compounding applications.

It is a further object of the present invention to provide a resin with a free resorcinol content near zero.

It is another object of the present invention to provide a method for producing a resorcinolic resin with a yield near 100%.

It is a further object of the present invention to provide a vulcanizable rubber composition having improved physical and mechanical properties.

It is another object of the present invention to provide a vulcanizable rubber composition having improved adhesion between the rubber and reinforcing material, while at the same time having improved mechanical properties for the cured rubber matrix in contact with the reinforcing material.

These and other objects of the invention will be more fully understood from the following description of the invention and the claims appended hereto.

DESCRIPTION OF THE PREFERRED EMBODIMENT

The present invention is directed to a method for reducing the free monomer content in a resin comprising reacting an effective amount of an aromatic olefinic compound with the resin. Suitable resins for use in the present invention include, but are not limited to, one or more resins selected from the group consisting of a dihydric phenol, a polyhydric phenol, a dihydric phenolic resin and a polyhydric phenolic resin; the addition product of at least one compound selected from the group consisting of a dihydric phenol, a polyhydric phenol, a dihydric phenolic resin and a polyhydric phenolic resin, and at least one compound selected from the group consisting of a monooxirane compound and a polyoxirane compound; and a phenol or alkyl or aralkyl substituted mono- or dihydric phenol modified resin selected from the group consisting of at least one dihydric phenol, polyhydric phenol, dihydric phenolic resin and polyhydric phenolic resin.

As will be appreciated by one skilled in the art, the reaction between the resin and the aromatic olefinic compound is an addition polymerization. The product resulting from the method of the present invention is a resin having a low free monomer content. Typically, the monomer will be resorcinol, although the content of other free monomers existing in the resin will also be reduced. Other free monomers include, for example, phenols, alkylphenols and alkylresorcinols.

As used herein, "low free resorcinol" refers to resins that have a low content of unreacted resorcinol. Preferably, the free resorcinol content of these resins is less than 10% unreacted resorcinol, more preferably less than 5% unreacted resorcinol, and most preferably less than 1% unreacted resorcinol.

The di- or polyhydric phenols of the invention include, but are not limited to, resorcinol, catechol, dihydroxybiphenol, trihydroxybiphenol, hydroquinone, alkylidenebisphenols or thio-bisphenols. The alkylidene group of the alkylidenebisphenols can have from about 1 to 12 carbon atoms. The alkylidenebisphenols include, but are not limited to, 4,4'-methylenediphenol (bisphenol F), and 4,4'-isopropylidenediphenol (bisphenol A). The di- or polyhydric phenolic resins of the present invention include di- or polyhydric phenol including, but not limited to, resorcinol, catechol, dihydroxybiphenol, trihydroxybiphenol, hydroquinone or aldehyde resins thereof.

Also within the scope of the invention are di- or polyhydric phenols that are substituted by at least one of the groups including an alkyl group having from about 1 to 12 carbon atoms, an aralkyl group having from about 6 to 12 carbon atoms, an alkanoyl group having from about 2 to 18 carbon atoms, an aroyl group having from about 7 to 11 carbon atoms or a halogen selected from the group consisting of chlorine and bromine.

"Oxirane" refers to the epoxide or alkylene oxide group having a general structure of formula (1)

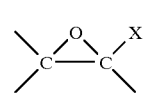

(1)

wherein X represents the point of attachment to the remainder of the molecule. It is well known by those skilled in the art that the epoxide function generally appears in the general structural form of formula (2)

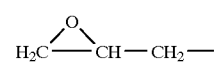

(2)

which is known as the glycidyl group and is attached to the remainder of a compound by, for example, an oxygen (a glycidyl ether), a nitrogen (a glycidyl amine or amide), or a carboxyl group (a glycidyl ester).

The monooxirane compounds of this invention include, but are not limited to, saturated or unsaturated alkylene oxides having from about 2 to 18 carbon atoms, a glycidyl ether compound, a glycidyl ester compound, or mixtures thereof. The saturated alkylene oxide compounds include, for example, ethylene oxide, α-olefin oxides having from about 4 to 18 carbon atoms, propylene oxide, styrene oxide, cyclohexene oxide, 4-vinylcyclohexenemonoxide, glycidol or mixtures thereof. Unsaturated alkylene oxides including at least 1 carbon-to-carbon unsaturated bond are also within the scope of the invention.

The polyoxirane compounds as used in the present invention include, but are not limited to, 4-vinylcyclohexenedioxide, epoxidized glycerides of unsaturated fatty acids, epoxidized nitrogen-containing material, polyglycidyl ethers, polyglycidyl esters, or mixtures thereof. The polyglycidyl ethers include, for example, diglycidyl ether of bisphenol A, diglycidyl ether of bisphenol F, trimethylol propane triglycidyl ether, a polyglycidyl ether of castor oil, a bis(3,4-epoxycyclohexyl) adipate, a dibromoneopentyl diglycidyl ether, or a glycidyl ether of a novolak epoxy resin. The glycidyl ether of the novolak epoxy resin includes, for example, polyglycidyl ethers of the di- or polyhydric phenolic resins as described above. The epoxidized nitrogen-containing material of the polyoxirane compound includes, for example, triglycidyl isocyanurate or triglycidyl para-aminophenol.

An effective amount of the aromatic olefinic compound should be used. As used herein, the term "effective amount" refers to that amount of an aromatic olefinic compound needed to "tie up" the free monomer in the resin. This amount will vary depending on the resin used and the initial free monomer content, and can be readily determined by one skilled in the art. The aromatic olefinic compounds as used in the present invention include any aromatic olefinic compounds of the general formula (3).

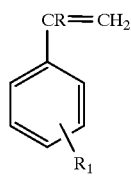

(3)

wherein R is selected from the group consisting of H, $CH_3$ and halogen, and $R_1$ is independently selected from the group consisting of H, OH, an alkyl group having from 1 to 6 carbons, a halogen and —CH=$CH_2$. Preferably, the aromatic olefinic compound is an aromatic vinyl compound including alpha-methylstyrene, p-methylstyrene, alpha-chlorostyrene and divinylbenzene. Most preferred is styrene. Vinyl naphthalenes are also aromatic olefinic compound within the scope of the invention.

If the resin used is the addition product of at least one compound selected from the group consisting of a dihydric phenol, a polyhydric phenol, a dihydric phenolic resin and a polyhydric phenolic resin and at least one compound selected from the group consisting of a monooxirane compound, and a polyoxirane compound, this reaction is preferably performed first. This reaction is facilitated by the use of a catalyst, including but not limited to a catalyst selected from the group consisting of trialkylphosphines, triarylphosphines, trialkylamines, dialkylaminomethylated phenol, 4-dimethylaminopyridine or other organic or inorganic bases, or a quaternary ammonium compound. Suitable quaternary ammonium compounds include, but are not limited to, tetraalkylammonium halides or sulfates such as tetrabutylammonium halide or sulfate, and benzyltrimethylammonium halide or hydroxide. As will be appreciated by one skilled in the art, these catalysts are mildly basic. The preferred catalyst for use in the reaction of step (a) is triphenylphosphine ($Ph_3P$). Typically, the reaction should take place at a temperature of between about 130 and 180° C., preferably between about 150 and 155° C. The reaction time is between about 3 and 5 hours, preferably about 3 hours.

Similarly, the reaction of the resin with an aromatic olefinic compound according to the methods of the present invention is preferably carried out in the presence of an acid catalyst. Suitable catalysts include, but are not limited to, $H_2SO_4$, $H_3PO_4$, aromatic and aliphatic sulfonic acids, and the like. The preferred catalyst is p-toluenesulfonic acid (PTSA). Typically, the reaction should take place at a temperature of between about 130 and 180° C., preferably between about 150 and 155° C. The reaction time is between about 3 and 5 hours, preferably about 3 hours.

One advantage of the method of the present invention is the production of a non-volatile resin having a low free resorcinol content. Other advantages of the procedure are that it generates a low amount of waste since yields are nearly 100%, has minimal toxicity levels, and uses relatively low temperatures and low pressures.

In a preferred embodiment of the methods of the present invention, resorcinol is reacted with bisphenol A epoxy in the presence of a $Ph_3P$ catalyst. The reaction is performed at a temperature of between about 150–155° C. for a period of between about 3–5 hours. The product of this reaction and any unreacted or free resorcinol are then further reacted with styrene in the presence of a PTSA catalyst. Again, the reaction is performed at a temperature of between about 150–155° C. for a period of between about 3–5 hours. The resulting product is a resorcinolic resin and a non-volatile adduct of resorcinol and styrene.

The methods of the present invention can also be used for producing low free resorcinol resins utilizing commercially available resins. Such resins include commercially available resorcinol-.formaldehyde resins, such as Penacolite® B-1A, Penacolite® B-18-S and Penacolite® B-19-S, commercially available from Indspec Chemical Corporation, Pittsburgh, Pa. and commercially available resorcinol-modified alkylphenol-formaldehyde resins.

The present invention is further directed to a low free resorcinol resin comprising the addition product of an aromatic olefinic compound and a resin. Suitable resins include one or more resins selected from the group consisting of a dihydric phenol, a polyhydric phenol, a dihydric phenolic resin and a polyhydric phenolic resin; the addition product of at least one of these resins and at least one compound selected from the group consisting of a monooxirane compound and a polyoxirane compound; and the phenol or alkyl or aralkyl substituted mono- or dihydric phenol modified forms of these resins. Preferably, this low free resorcinol resin is prepared according to the method described above. The resins also have a low content of other free monomers. In a preferred embodiment, the resorcinolic resin addition product is that formed between resorcinol and bisphenol A epoxy, further reacted with styrene.

The resorcinolic resins of the present invention are characterized as being non-volatile, that is, having free resorcinol content near zero. Accordingly, these resins can be used in any application in which a non-volatile, low free resorcinol resin is desired.

The resins of the present invention are particularly useful in rubber compounding applications. Historically, resorcinol and resorcinol-formaldehyde resins have been used in the tire and rubber industry as adhesion promoters for synthetic fabric and steel cord to rubber bonding. Though resorcinol enhances both the mechanical and bonding properties of the cured rubber compounds, the volatility of this material under rubber processing temperatures has prompted some tire manufacturers to use precondensed resorcinol-formaldehyde novolak type resins instead of a resorcinol monomer. The main advantage for using these resins in the rubber compound formulations is the reduction of free resorcinol content. The resins of the present invention serve to reduce the free resorcinol content even further. In addition, the resins of the present invention can be produced at a low cost, and provide comparable performance for this application than those resins currently commercially available. In addition to their low free monomer content, the resins of the present invention, when used in rubber compounding applications, yield a low softening point that enhances the processing of the rubber, provides enhanced adhesion characteristics with reinforcements such as steel, polyester, nylon and others, and provides enhanced mechanical properties such as modulus and elongation.

The present invention is therefore further directed to a vulcanizable rubber composition having improvements in physical and mechanical properties such as dynamic stiffness, hardness, scorch safety and cure time. The vulcanizable rubber composition of the present invention comprises: (a) a rubber component selected from natural rubber, synthetic rubber or combinations thereof; (b) a methylene donor; and (c) a methylene acceptor. The methylene acceptor comprises the addition product of an aromatic olefinic compound and a resin; suitable resins include one or more resins selected from the group consisting of a dihydric phenol, a polyhydric phenol, a dihydric phenolic resin and a polyhydric phenolic resin; the addition product of at least one of these resins and at least one compound selected from the group consisting of a monooxirane compound and a polyoxirane compound; and the phenol or alkyl or aralkyl substituted mono- or dihydric phenol modified forms of these resins. Thus, the methylene acceptor is the low free resorcinol resins prepared by the methods described above.

Any suitable methylene donor can be used. Preferred are hexamethylenetetramine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine.

Typically, the methylene acceptor is incorporated into the rubber component in an amount ranging from about 1 to 25 parts by weight based on 100 parts by weight of the rubber component (1 to 25 phr). Preferably, the methylene acceptor is incorporated into the rubber component in an amount from about 1 to 5 phr.

Generally, the weight ratio of methylene acceptor to methylene donor is from about 1:10 to 10:1, more preferably 1:3 to 3:1.

Typically, the mole ratio of the di- or polyhydric phenol or the di- or polyhydric phenolic novolak resin to the mono- or polyoxirane compound is between about 1:0.05 to 1:1.5.

In a preferred embodiment, a vulcanizable rubber composition is provided as described above wherein the methylene acceptor is the addition product of resorcinol and the diglycidyl ether of bisphenol A, further reacted with styrene. The preferred embodiment also includes using $Ph_3P$ as a catalyst when the addition product of resorcinol and diglycidyl ether of bisphenol A is formed and PTSA as a catalyst when further reacting this addition product with styrene.

It will be understood by those skilled in the art that it may be beneficial to form the initial addition product of the methylene acceptor in the presence of one or more solvents, including but not limited to, aromatic hydrocarbons, such as toluene, xylene, ethylbenzene, or ketones such as methylisobutyl ketone.

It will be understood by those skilled in the art that the vulcanizable rubber composition of this invention may also include at least one additive comprising sulfur, carbon black, zinc oxide, silica, an anti-oxidant, a stearate, an accelerator, an oil or an adhesion promoter. In the preferred embodiment, the methylene acceptor further includes amorphous silica.

In another embodiment of this invention, a vulcanizable rubber composition is provided as described above, further comprising (d) a reinforcing material. Any reinforcing material known in the art can be used, including, but not limited to, nylon, rayon, polyester, aramid, glass, steel (brass, zinc or bronze plated) or other organic and inorganic compositions. These reinforcing materials may be in the form of filaments, fibers, cords or fabrics.

Following formation of the rubber component, vulcanization can be carried out by methods known in the art.

It will be appreciated that the resin formed by the reaction of the methylene acceptor and methylene donor as described above promotes adhesion between the rubber and the reinforcing materials as described above while simultaneously providing an improvement in the rubber vulcanizate properties such as hardness and dynamic stiffness, as well as improving scorch safety time and providing longer cure times when compared to the prior art. The rubber composition of the present invention further has improved adhesion properties for adhering rubber to the reinforcing materials as described above. Optionally, the reinforcing material can be pretreated or coated with adhesives.

EXAMPLES

The following examples are intended to illustrate the invention and should not be construed as limiting the invention in any way.

Example 1

Synthesis of Resorcinol-Bisphenol A Epoxy Resin

A 15 gallon reaction kettle equipped with a stirrer, temperature controller, condenser and raw material addition setup was charged with approximately 14.15 kg of resorcinol and 129 g of triphenylphosphine under constant stirring. The reactor contents were heated to between about 150 and 155° C. About 25 kg of diglycidyl ether of bisphenol A was added stream wise to the reactor over a period of about 1.5 hours. The diglycidyl ether of bisphenol A was obtained from Dow Chemical as DER-331. Following addition of the epoxy, the reaction mixture was stirred continuously at the same temperature for an additional period of 1.5 hours. The resulting resin had a softening point of 84.3° C. and a free resorcinol content of 10.0 weight %. These results are shown in Table 1 below.

Example 2

Synthesis of Styrene Modified Resorcinol-Bisphenol A Epoxy Resin

The method of Example 1 was repeated in a 500 ml reaction kettle with about 55 g of resorcinol, about 0.5 g of triphenylphosphine, and about 98.6 g of the diglycidyl ether of bisphenol A. Following stirring of the reaction mixture for about 1.5 hours, about 0.7 g of para-toluene sulfonic acid (PTSA) was added to the reaction kettle and the mixture stirred for about 5 minutes. Then, about 13.0 g of styrene were added dropwise from an addition funnel over a period of about 1.5 hours. Following completion of the styrene addition, the reaction mixture was stirred for an additional period of about an hour. Following the hour, about 0.4 g of 50% aqueous sodium hydroxide solution was added to neutralize the acid catalyst. Finally, a vacuum of 28" Hg was applied to remove any unreacted monomers as distillate. The resulting resin had a softening point of 89.0° C. and a free resorcinol content of 4.5 weight %. No distillate was collected during the vacuum dehydration, indicating the complete addition reaction between resorcinol and epoxy and further reaction with styrene monomer. The results are shown in Table 1 below.

Examples 3–5

Synthesis of Styrene Modified Resorcinol-Bisphenol A Epoxy Resins

The procedure of Example 2 was repeated in Examples 3 through 5 varying the amounts of styrene used. This amount, as well as the weight % of free resorcinol and the softening points of the resulting resins, are all shown in Table 1 below.

As can be seen from Table 1, no distillate was removed in any of Examples 3 through 5, again demonstrating that resins with a low free resorcinol content can be prepared according to the process of this invention. The results of these examples further indicate that a resin with almost 100% yield is possible utilizing the methods of this invention.

TABLE 1

Styrene Modified Resorcinol-Bisphenol A Epoxy Resin

| | Example 1 | Example 2 | Example 3 | Example 4 | Example 5 |
|---|---|---|---|---|---|
| Raw Materials (Grams) | | | | | |
| 1. Resorcinol | 14.15 kg | 55.0 | 55.0 | 55.0 | 110.1 |
| 2. Triphenylphosphine | 0.13 kg | 0.5 | 0.5 | 0.5 | 1.0 |
| 3. DER-331 | 25.0 kg | 98.6 | 98.1 | 97.4 | 195.2 |
| 4. PTSA | — | 0.7 | 0.7 | 0.7 | 1.4 |
| 5. Styrene | — | 13.0 | 26.0 | 52.0 | 156.0 |
| 6. Sodium Hydroxide (50%) | — | 0.4 | 0.4 | 0.4 | 0.8 |
| Distillate Removed at 150–155° C./28" Hg Vac. | None | None | None | None | None |
| Resin Properties | | | | | |
| Softening Point (° C.) | 84.3 | 89.0 | 89.4 | 90.7 | 92.2 |
| Free Resorcinol (wt % by GC) | 10.0 | 4.5 | 2.5 | 0.3 | <0.01 |

Examples 6–7
Synthesis of Styrene Modified Commercially Available Resorcinol Formaldehyde Resins A 500 ml reaction kettle equipped with a stirrer, thermometer, reflex condenser and addition funnel was charged with about 200 g of Penacolite® B-1A, a commercially available resorcinol formaldehyde resin obtained from Indspec Chemical Corporation, under constant stirring. The resin was heated to a temperature of between about 150 and 155° C. About 1.0 g of PTSA was then added at the same temperature and mixed for about 5 minutes. Styrene was then added dropwise over a period of about 3 to 4 hours, in the amount indicated in Table 2. Following styrene addition, the reaction mixture was stirred for an additional period of about 1 hour. Following the hour, about 0.5 g of 50% aqueous sodium hydroxide solution was added to neutralize the acid catalyst. Finally, the resin was dehydrated under vacuum (28" Hg) at 150 to 155° C. to remove any unreacted styrene monomer in the form of a distillate. The results are shown in Table 2 below. As can be seen in Table 2, all of the styrene monomer reacted with the resin material. Also, the unreacted resorcinol present in the Penacolite® B-1A resin was reduced due to its reaction with styrene.

TABLE 2

Styrene Modification on Resorcinol-Formaldehyde Resin

| | Penacolite ® Resin B-1A | | |
|---|---|---|---|
| Resin Used | Control | Example 6 | Example 7 |
| Raw Materials (grams) | | | |
| 1. Resin | 200.0 | 200.0 | 200.0 |
| 2. PTSA | — | 1.0 | 1.0 |
| 3. Styrene | — | 20.0 | 80.0 |
| 4. Sodium Hydroxide (50%) | — | 0.5 | 0.5 |
| Distillate Removed at 150–155° C./28" Hg Vac. | — | 0.1 | 0.2 |
| Resin Properties | | | |
| Softening Point (° C.) | 94.2 | 101.0 | 107.2 |
| Free Resorcinol (wt % by LC/GC) | 17.5 | 12.0 | 5.0 |

Examples 8–9
Synthesis of Styrene Modified Resorcinol-Formaldehyde Resins

The procedure of Examples 6 and 7 was repeated using RM-441 modified resorcinol-formaldehyde resins commercially obtained from Indspec Chemical Corporation as Penacolite® B-18-S and Penacolite® B-19-S. RM-441 is a water soluble resorcinol oligomer obtained from the manufacture of resorcinol, and has a typical composition of about 2 to 8 weight % resorcinol, 2 to 12 weight % dihydroxydiphenol, 25 to 35 weight % trihydroxydiphenol and the balance higher molecular weight polymers. Penacolite® B-18-S and B-19-S resins contain about 18 weight % and 11 weight % free resorcinol, respectively. The amount of each starting material used, as well as properties of the resulting products, are shown in Table 3. As can be seen from the table, a negligible amount of distillate was obtained, therefore indicating that all of the styrene reacted with the Penacolite® resins. In addition, the free resorcinol content of the final modified resins was lower when using the styrene addition, as compared to the control values.

TABLE 3

Styrene Modification of RM-441 Modified Resorcinol-Formaldehyde Resins

| | Penacolite ® B-18-S | | Penacolite ® B-19-S | |
|---|---|---|---|---|
| Resin Used | Control | Example 8 | Control | Example 9 |
| Raw Materials (grams) | | | | |
| 1. Resin | 200.0 | 200.0 | 200.0 | 200.0 |
| 2. PTSA | — | 1.0 | — | 2.0 |
| 3. Styrene | — | 80.0 | — | 80.0 |
| 4. Sodium Hydroxide (50%) | — | 0.5 | — | 1.0 |
| Distillate Removed at 150–155° C./28" Hg Vac. (grams) | — | 0.1 | — | 0.3 |
| Resin Properties | | | | |
| Softening Point (° C.) | 101.1 | 105.0 | 102.7 | 108.4 |
| Free Resorcinol (wt. % LC/GC) | 17.5 | 4.5 | 10.5 | 5.0 |

Example 10
Styrene Modification on Resorcinol Modified Phenolic Resin

The methods of Examples 6–9 were repeated using a resorcinol modified alkylphenol-formaldehyde resin. This resin contained about 10.0 weight % of free resorcinol and had a softening point of about 100° C. The amount of each starting material used, as well as the results, are presented in Table 4 below. As can be seen from Table 4, a higher distillate amount was removed in this example. The distillate amount can be lowered by increasing the amount of catalyst and the reaction time. In addition, the free resorcinol content was less than 1.0 weight %.

TABLE 4

Styrene Modification of Resorcinol Modified Alkylphenol-formaldehyde Resin

| | Control | Example 10 |
|---|---|---|
| Raw Materials (grams) | | |
| 1. Resin | 200.0 | 200.0 |
| 2. PTSA | — | 1.0 |

TABLE 4-continued

Styrene Modification of Resorcinol Modified
Alkylphenol-formaldehyde Resin

|  | Control | Example 10 |
|---|---|---|
| 3. Styrene | — | 80.0 |
| 4. Sodium Hydroxide (50%) | — | 0.5 |
| Distillate Removed at 150–155° C./128" Hg Vac. (grams) | — | 4.5 |
| Resin Properties |  |  |
| Softening Point (° C.) | 100 | 116.2 |
| m/p cresols | 7.0 | 5.5 |
| Free Resorcinol (wt %, LC/GC) | 10.0 | 0.25 |

Example 11

Synthesis of Styrene Modified Resorcinol-Bisphenol A Epoxy Resin

A 4 liter reaction kettle equipped with a stirrer, thermometer, reflex condenser and addition funnel was charged with about 440.4 g of resorcinol and about 4.0 g of triphenylphosphine under constant stirring. The mixture was heated to a temperature of between about 150–155° C. About 778 g of the diglycidyl ether of bisphenol A were slowly added to the mixture over a period of about 1.5 hours. About 12 g of PTSA were then added to the kettle and mixture stirred for about 5 minutes at the same temperature. Then, about 305.5 g of styrene were added dropwise from the addition funnel over a period of about 1.5 hours at the same temperature. Following styrene addition, the reaction mixture was stirred for an additional period of about 1 hour, after which time about 6.0 g of 50% aqueous sodium hydroxide solution were added to neutralize the PTSA catalyst. Finally, vacuum was applied (28" Hg) at the same temperature to remove the water condensate which resulted from the catalyst and sodium hydroxide solution. The resulting resin (identified herein as 125-302) had a softening point of 91.6° C. and a free resorcinol content of about 1.0 weight %.

Example 12

Evaluation of Styrene Modified Resorcinol-Bisphenol A Epoxy Resin

The resin prepared according to Example 11 was evaluated in a black natural rubber compound to assess and compare its performance against commercially available resorcinol-based resins, Penacolite® B-20-S, commercially available from Indspec Chemical Corporation, and ALNOVOL VPN 1755, available from Hoechst Chemical. Penacolite® B-20-S typically has a softening point of about 104° C. and a free resorcinol content of 3%; ALNOVOL VPN 1755 has a softening point of about 115° C. with a free resorcinol content of about 1 %. Black natural rubber compositions having the formulation shown in Table 5 were prepared in a 3-stage mixing procedure. These rubber compositions were then used to evaluate the adhesion and reinforcing effects of the resorcinol compounds of this invention as methylene acceptors in combination with the methylene donor hexamethoxymethylmelamine (HMMM). The resins were tested at their estimated optimal weight ratios at constant combined loadings of 4 parts by weight in the rubber compound.

TABLE 5

Rubber Compound for Adhesion and Mechanical Properties

| Masterbatch | phr[1] |
|---|---|
| Natural Rubber | 100.0 |
| Carbon Black N-326 | 55.0 |
| Zinc Oxide | 8.0 |
| Stearic Acid | 1.0 |
| N-(1,3-Dimethyl butyl)-N'-Phenyl-p-Phenylene Diamine | 2.0 |
| Polymerized 1,2-Dihydro-2,2,4-Trimethylquinoline | 1.0 |
| N-(Cyclohexylthio)Phthalimide | 0.2 |
| Total | 167.2 |
| Insoluble Sulfur | 4.00 |
| N,N-Dicyclohexyl-2-Benzothiazolesulfenamide (accelerator) | 1.00 |
| Cobalt Boron Complex (22.5%) | 0.45 |
| Methylene Acceptor/Donor Ratio | 2.4/1.6 |

[1]parts by weight per 100 parts of rubber

The rubber master batch was mixed in the first stage to about 150° C. in a Banbury mixer. In a second stage, a methylene acceptor prepared according to the methods of Example 11, designated herein as 125-302, with the inclusion of a cobalt boron complex was then mixed into an appropriate amount of the master batch on the 2-roll mill at about 121° C. The insoluble sulfur, accelerator and appropriate amount of HMMM as indicated in Tables 5 and 6 were mixed in the third stage at 95° C. The test compounds were conditioned overnight in a constant temperature room at about 23° C. and 50% relative humidity. The compounds were then tested for rheometer cure, shaped and optimum cured at 150° C. for the evaluation of wire adhesion and mechanical properties.

Cure properties were measured with a Monsanto 100 rheometer at 150° C., 1° arc and 1.67 Hz according to ASTM D 2084. Wire pullout adhesion was determined for each test compound by ASTM D 2229 using 3×0.2+6×0.35 brass-plated steel cord with 63.5% copper plating embedded in 19.0 mm in the rubber pad. Dynamic mechanical properties were determined with a Rheometrics Scientific mechanical spectrometer at 0.2 and 2.0% torsional sheer strain at 1 Hz and 23° C. Dynamic stiffness G' was measured at 0.2% strain and tangent delta, an indicator of compound hysteresis or heat buildup, was measured at 2.0% strain.

The commercial methylene acceptors, Penacolite® B-20-S and VPN 1755, and resin 125-302 were each combined with methylene donor HMMM and evaluated for cure, wire adhesion and mechanical properties, as discussed above. The test data are given in Table 6. As can be seen from the table, Compound C made with the 125-302 methylene acceptor of the present invention was observed to be non-fuming and was comparable to the control resins, Compounds A and B. The rheometer cure properties, torque rise MH-ML, scorch time $t_{s2}$ and optimum cure time $t_{90}$ of Compound C were also comparable to control Compounds A and B. The initial, steam and humidity aged wire adhesion of Compound C was also comparable to control Compounds A and B. In addition, Compound C developed similar tensile properties and hysteresis (tangent delta) with higher dynamic stiffness (G') and hardness than the controls.

TABLE 6

Rubber Compound Properties

| Compound | A | B | C |
|---|---|---|---|
| Methylene Acceptor/Donor | B-20-S/HMMM | VPN-1755/HMMM | 125-302/HMMM |
| Weight Ratio acceptor/donor, phr | 2.4/1.6 | 2.411.6 | 2.4/1.6 |
| Fuming at 120° C. | Slight | None | None |
| Rheometer Cure at 150° C. | | | |
| MH-ML, dN-m | 43.2 | 40.7 | 42.6 |
| $t_{s2}$, minutes | 4.6 | 5.4 | 5.3 |
| $t'_{90}$ minutes | 19.2 | 20.5 | 22.8 |
| Wire Adhesion N | | | |
| (% Rubber Coverage) | | | |
| Unaged | 1246 (88) | 1146 (83) | 1114 (85) |
| Steam, 16 hours at 120° C. | 1271 (90) | 1266 (100) | 1282 (90) |
| Humidity, 14 days at 85° C./95% R. H. | 1243 (95) | 1172 (90) | 1182 (90) |
| Dynamic Mechanical | | | |
| G' at 0.2% strain MPA | 23.10 | 19.40 | 26.60 |
| Tangent Delta at 2.0% Strain | 0.198 | 0.209 | 0.206 |
| Shore A Hardness | 81 | 77 | 93 |
| Tensile Properties | | | |
| 100% Modulus, MPa | 4.56 | 4.55 | 4.75 |
| Tensile Strength, MPa | 28.18 | 28.23 | 28.06 |
| Elongation, % | 458 | 455 | 458 |

In short, the resin produced by the methods of the present invention gave improved compound mechanical properties while maintaining the rheometer cure and brass wire adhesion properties of the commercially available control resins. Thus, the present invention provides resins with low free resorcinol content that do not sacrifice performance when compared with resins known in the art.

Whereas particular embodiments of this invention have been described above for purposes of illustration, it will be evident to those skilled in the art that numerous variations of the details of the present invention may be made without departing from the invention as defined in the appended claims.

What is claimed is:

1. A vulcanizable rubber composition comprising:
   (a) a rubber component selected from natural rubber, synthetic rubber or combinations thereof;
   (b) a methylene donor; and
   (c) a methylene acceptor having less than 10% volatile free phenolic monomer; wherein said methylene acceptor is the addition product of a first compound and an aromatic olefinic compounds; wherein said first compound is selected from the group consisting of:
      (i) one or more resins selected from the group consisting of a monohydric phenolic resin, a dihydric phenolic resin and a polyhydric phenolic resin;
      (ii) the addition product of at least one compound selected from the group consisting of a dihydric phenol, a polyhydric phenol, a dihydric phenolic resin and a polyhydric phenolic resin, and at least one compound selected from the group consisting of a monooxirane compound and a polyoxirane compound; and
      (iii) a monohydric phenolic resin, a dihydric phenolic resin or a polyhydric phenolic resin that comprises one or more substituents selected from the group consisting of an alkyl group and an aralkyl group; and wherein said aromatic olefinic compound is selected from the group consisting of vinyl naphthalene and aromatic olefinic compounds having the formula (3)

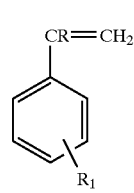

(3)

wherein (R) is selected from the group consisting of H, $CH_3$ and halogen; and $R_1$ is independently selected from the group consisting of H, OH, an alkyl group having from 1 to 6 carbons, a halogen and $-CH=CH_2$.

2. The composition of claim 1, wherein said di- or polyhydric phenolic resin is selected from the group consisting of resorcinol, catechol, dihydroxybiphenol, trihydroxybiphenol, hydroquinone, alkylidene bisphenols, wherein said alkylidene group has from about 1 to 12 carbon atoms, and thiobisphenols; and wherein said di- or polyhydric phenolic resin is optionally substituted by at least one of the groups comprising an alkyl group having from about 1 to 12 carbon atoms, an aralkyl group having from about 1 to 12 carbon atoms, an alkanoyl group having from about 2 to 18 carbon atoms, an aroyl group having from about 7 to 11 carbon atoms, or a halogen selected from the group consisting of chlorine and bromine.

3. The composition of claim 1, wherein said monooxirane compound is selected from the group consisting of saturated or unsaturated alkylene oxides having from about 2 to 18 carbon atoms, a glycidyl ether compound, a glycidyl ester compound, and mixtures thereof; and wherein said polyoxirane compound is selected from the group consisting of a 4-vinylcyclohexene dioxide, epoxidized glycerides of unsaturated fatty acids, epoxidized nitrogen-containing material, polyglycidyl ethers, polyglycidyl esters, and mixtures thereof.

4. The composition of claim 1, wherein said dihydric phenolic resin is resorcinol and said polyoxirane compound is a diglycidyl ether of bisphenol A.

5. The composition of claim 1, wherein the methylene acceptor further includes an amorphous silica.

6. The composition of claim 1, wherein the molar ratio of said di- or polyhydric phenol or said di- or polyhydric phenolic resin to said monooxirane compound, alkylene carbonate or polyoxirane compound in said addition produce is between about 1:0.05 to 1:1.5.

7. The composition of claim 1, wherein said aromatic olefinic compound is selected from the group consisting of alpha-methylstyrene, p-methylstyrene, alpha-chlorostyrene, divinylbenzene and vinyl naphthalenes.

8. The composition of claim 7, wherein said aromatic olefinic compound is styrene.

9. The composition of claim 1, wherein said methylene acceptor is incorporated into said rubber component in an amount from about 1 to 25 parts by weight based on 100 parts by weight of said rubber component.

10. The composition of claim 9, wherein said methylene acceptor is incorporated into said rubber component in an amount from about 1 to 5 parts by weight based on 100 parts by weight of said rubber component.

11. The composition of claim 1, wherein the weight ratio of methylene acceptor to methylene donor is between about 1:10 to 10:1.

12. The composition of claim 1, wherein said methylene donor is selected from the group consisting of hexamethylenetetramine, di-, tri-, tetra-, penta- or hexa-N-methylol-melamine, hexamethoxymethylmelamine, oxazolidine or N-methyl-1,3,5-dioxizene.

13. The composition of claim 1, further including (d) a reinforcing material.

14. The composition of claim 13, wherein said reinforcing material is selected from the group consisting of nylon, rayon, polyester, aramid, and glass and steel in the form of filaments, fibers, cords or fabrics.

15. The composition of claim 1, further comprising an additive selected from the group consisting of sulfur, carbon black, zinc oxide, silica, an anti-oxidant, a stearate, an accelerator, an oil and an adhesion promoter.

* * * * *

UNITED STATES PATENT AND TRADEMARK OFFICE
CERTIFICATE OF CORRECTION

PATENT NO. : 5,945,500

DATED : August 31, 1999

INVENTOR(S) : Raj B. Durairaj, et al.

It is certified that error appears in the above-identified patent and that said Letters Patent is hereby corrected as shown below:

On the Title Page:

Under References cited, after "4,889,891" add --525/139--.

Col. 5, line 18, "compound" should read --compounds-- in accordance with amendment filed February 19, 1999.

Col. 11, Table 4, 4th line under column 1, "C./128"" should read --C/28"--.

Col. 12, line 60, "$t_{90}$" should read --$t'_{90}$--.

Col. 13, Table 6, Column B, 3rd line, "2.411.6", should read --2.4/1.6--.

Col. 13, line 51, "compounds" should read --compound--.

Column 14, line 52, "produce" should read --product--.

Signed and Sealed this

Tenth Day of April, 2001

Attest:

NICHOLAS P. GODICI

*Attesting Officer*  *Acting Director of the United States Patent and Trademark Office*